United States Patent [19]

Mazany

[11] Patent Number: 4,876,305

[45] Date of Patent: Oct. 24, 1989

[54] OXIDATION RESISTANT COMPOSITIONS FOR USE WITH RARE EARTH MAGNETS

[75] Inventor: Anthony M. Mazany, Broadview Heights, Ohio

[73] Assignee: The B. F. Goodrich Company, Akron, Ohio

[21] Appl. No.: 132,890

[22] Filed: Dec. 14, 1987

[51] Int. Cl.$^4$ .............................................. C08K 3/00
[52] U.S. Cl. ................................... 524/401; 524/434; 524/435; 524/431; 524/403; 524/779; 524/780; 524/785; 525/523; 528/38
[58] Field of Search .................... 525/523; 528/38; 524/779, 785, 780, 401, 434, 435, 431, 403

[56] References Cited

U.S. PATENT DOCUMENTS

| | | | |
|---|---|---|---|
| 3,220,878 | 11/1965 | Pines et al. | 525/523 |
| 3,247,280 | 4/1966 | Kanner | 525/523 |
| 3,868,342 | 2/1975 | Magne | 525/523 |
| 4,241,116 | 12/1980 | Taniyama et al. | 428/412 |
| 4,287,326 | 9/1981 | Mikami | 525/523 |
| 4,474,930 | 10/1984 | Mikami et al. | 525/523 |
| 4,558,007 | 12/1985 | Gray | 523/458 |
| 4,559,387 | 12/1985 | Endo et al. | 528/38 |
| 4,602,078 | 7/1986 | Joseph et al. | 528/38 |

FOREIGN PATENT DOCUMENTS 59-94433  5/1984  Japan .

OTHER PUBLICATIONS

"Effects of Surface Treatment for Thermoplastic Magnet" by Satoh, et al, IEEE Transaction Journal on Magnetics in Japan, vol. TJMJ-1, No. 3, Jun. 1985, pp. 387 and 388.

"Thermoplastic Magnet Having Highly Improved Heat-Resistance" by Satoh, et al., IEEE Translation Journal on Magnetics in Japan, vol. TJMH-1, Nov. 8, 1985.

Julius Grant, ed. Hackh's Chemical Dictionary (New York, McGraw-Hill Book Co., 1972), p. 25.

*Primary Examiner*—Melvyn I. Marquis
*Attorney, Agent, or Firm*—James R. Lindsay; Daniel J. Hudak

[57] ABSTRACT

An oxidation of rare earth magnetic materials and powders thereof are greatly reduced when coated with a binary or a ternary composition made from (a) at least one amino containing silane compound such as an aminosilane or a polyaminosilane, (b) at least one epoxy resin or (c) an epoxysilane compound. The composition is utilized to coat rare earth magnets or magnet materials or in association with a binder to form a matrix substantially encapsulating the same.

18 Claims, No Drawings

OXIDATION RESISTANT COMPOSITIONS FOR USE WITH RARE EARTH MAGNETS

FIELD OF THE INVENTION

The present invention relates to compositions for coating rare earth magnets. More specifically, the present invention relates to oxidation resistant compositions for coating rare earth magnets usually in powder form with binary or ternary mixtures of at least an aminosilane compound, at least one epoxy resin, or at least one epoxy silane compound. Corrosion resistance of the rare earth magnet powder is improved by treatment with an inhibitor composition, either alone or in association with the oxidation resistant composition.

BACKGROUND ART

Rare earth magnets and magnet powders are used extensively in electromechanical devices such as motors and actuators. It is known that rare earth magnets and especially rare earth magnet powders are highly reactive toward oxygen, moisture and other chemical agents such as chloride ions. The use of such reactive rare earth magnet powders in bonded magnets limits their application frequently to temperatures under 100° C. Inasmuch as rare earth magnets and rare earth magnet powders have been known for approximately 15 years, a need has existed with regard to their oxidative and corrosive stability, a need which has been heightened with the introduction of the iron-based rare earth magnet alloys.

An article "Effects of Surface Treatment for Thermoplastic Magnet" by Satoh, et al, IEEE Translation Journal on Magnetics in Japan, Volume TJMJ-1, No. 3, June 1985, page 387,388, disclosed the use of various coupling agents which are used to increase the loading of magnetic alloy powder and to improve the processing of the same material.

The article "Thermoplastic Magnet Having Highly Improved Heat-Resistance" by Satoh, et al, IEEE Translation Journal on Magnetics in Japan, Volume TJMJ-1, No. 8, November 1985, relates to the use of a heat resistant coupling agent which was utilized to coat $SmCo_5$ powders.

Both of the above articles have graphs indicating dramatic drop off in magnetic properties at temperatures in excess of 100° C. and essentially nonexistent magnetic properties at 200° C.

Japanese patent application 84/94433 filed May 14, 1984, relates to an anti-corrosive coating for metals containing ethylene vinylacetate polymers, acrylic polymers, or polyvinyl acetals; amino silanes; and epoxides. The compound forms a weather-resistant anti-corrosive coating for metals.

U.S. Pat. No. 4,241,116 to Taniyama et al relates to a method of treating the surface of a shaped polycarbonate resin. A first treating layer contains a bisphenol type epoxy resin. The article is then subsequently coated with a composition containing three different types of compounds, the first compound being the reaction mixture of an aminoalkylalkoxy silane with an epoxyalkylalkoxy silane, the second compound is a mixture of an alkyl-modified methylol melamine with an alkyl resin and the third compound is an acrylic acid derivative.

U.S. Pat. No. 4,558,077 to Gray relates to high glass transition temperature epoxy resins, that is polyglycidyl ethers of polyphenol alkanes, which are utilized to bond rare earth-iron alloy magnets.

SUMMARY OF THE INVENTION

An aspect of the present invention relates to providing an oxidation resistant coating for rare earth magnets and magnet powders. The oxidation resistant coating dramatically increases the oxidation resistance of the magnet materials, especially at high temperatures, i.e., about 300° C. The use of an aminosilane compound and at least one of the two following compounds make up the oxidation resistant coating; i.e., an epoxy silane and/or an epoxy resin. The rare earth magnets can be further protected with regard to corrosion by treating the magnets or powders thereof with an inhibitor compound, such as a chromate, dichromate, molybdate, polymolybdate, phosphate or similar compound; or combinations thereof. The rare earth magnets and powders thereof are known to the art and to the literature and often contain neodymium, samarium, praseodymium, iron, cobalt, and other alloying elements such as aluminum, boron, carbon, chromium, copper, gallium, hafnium, manganese, niobium, tantalum, titanium, vanadium, zirconium, and the like.

It should be noted that coatings which demonstrate excellent oxidation resistance do not necessarily possess equally good corrosion resistance as well as the converse. One aspect of the present invention is a coating which imparts both improved oxidation and corrosion resistance to the treated magnetic materials.

The invention will be better understood by reference to the following detailed description.

DETAILED DESCRIPTION

Generally, any conventional rare earth magnet or magnetic material including alloys and mixtures thereof can be utilized in the present invention as well as those known to the art and to the literature. By the term "rare earth magnet or magnetic material," it is meant any magnetic material or magnetizable material which contains at least one rare earth element therein, that is an element having an atomic number of from 57 to 71. Such elements can be contained in either minor or major amounts. Such rare earth magnets can contain minor or major amounts of non-rare earth elements such as iron, cobalt, nickel, boron, and the like. Another definition of rare earth magnetic materials are compositions, that is alloys and/or mixtures, containing one or more rare earth elements which generally have good magnetic properties, that is magnetic properties such as generating a magnetic force which is greater than that obtained utilizing conventional non-rare earth magnets such as alloys of nickel, iron, and cobalt. Often times the residual induction value ($B_r$) of the rare earth magnets is 25 percent greater than that generated by conventional non-rare earth magnet materials such as barium ferrite.

The various types of rare earth magnets or magnetic materials which can be protected with regard to corrosion as well as to oxidation are generally known to the art as well as to the literature. Such rare earth magnets are described in various articles and especially patents as in U.S. Pat. No. 4,496,395 to Croat, U.S. Pat. No. 4,558,077 to Gray, U.S. Pat. No. 4,597,938 to Matsuura et al, U.S. Pat. No. 4,601,875 to Yamamoto et al, U.S. Pat. No., 4,684,406 to Matsuura et al, European patent application 108,474 to General Motors, and European patent application Nos. 106,948 and 134,304 to Sumitomo Special Metals Company Ltd., which are hereby fully incorporated by reference with regard to all rare earth magnet compositions, methods of preparation, and the like. For example, various rare earth magnets can contain alloys of neodymium or praseodymium in combination with iron and boron, as in elementary ratios of 2 moles of neodymium to 14 moles of iron to 1 mole of boron, all as described in U.S. Pat. No. 4,558,077. Another rare earth magnet is an alloy of samarium and cobalt as in a mole ratio of approximately 1 to 5. Other rare earth magnets are made from alloys of samarium, cobalt, and iron wherein the iron is generally present in small amounts. Still other rare earth magnet alloys contain praseodymium and cobalt. A large class of rare earth magnet or magnetic materials are various alloys of iron, boron, at least one rare earth element, and optionally cobalt. In the three component system, the amount of boron is generally from about 2 percent to about 28 percent by weight, the amount of the one or more rare earth elements is from about 8 percent to about 30 percent by weight, with the remaining balance being iron. When cobalt is utilized, the amount of the one or more rare earth elements is from about 8 to about 30 percent by weight, the amount of boron is from about 2 to about 28 percent by weight, cobalt is utilized in an amount of from about 0.1 to about 50 percent by weight, and the balance is iron.

Other rare earth magnet compositions are set forth in "Rare Earth Permanent Magnets," E. A. Nesbitt and J. H. Wernick, Academic Press, New York 1973, which is hereby fully incorporated by reference.

A problem with existing rare earth magnets or magnetic materials is that they are readily oxidized, especially at high temperatures. However, unexpectantly good magnetic retention is obtained with rare earth magnets when coated, that is, encapsulated, surrounded or covered with the oxidation resistant compositions of the present invention. That is, irreversible losses of less than 10 percent of residual induction or coercive force are achieved by the oxidation resistant compositions of the present invention when the coated magnets or magnetic materials are subjected to temperatures of approximately 300° C. for about two hours. Futhermore, corrosion resistance of the rare earth magnets or magnetic materials are dramatically improved when treated with an inhibitor composition as described hereinbelow.

According to the concepts of the present invention, various binary or ternary systems, that is oxidation resistant compositions are formed by combining an aminosilane compound and either an epoxy silane and/or an epoxy resin compound.

Considering the amino containing silane compounds, these are generally of two types, an aminosilane compound or a polyaminosilane compound.

The aminosilanes and polyaminosilanes generally have the formula:

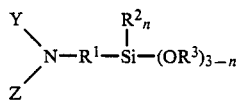

wherein $R^1$ is generally a hydrocarbon group having from 1 to about 30 carbon atoms. The divalent $R^1$ moiety can be an aliphatic, aromatic, or combinations thereof, e.g., an alkyl group, an aromatic group, an alkylalkoxy group, an alkylalkenyl group or an alkylaryl group. When $R^1$ is aliphatic, an alkyl group is preferred. When $R^1$ is aliphatic, it can contain 1 to 20 carbon atoms, desirably from 1 to 11 carbon atoms, and preferably 3 to 4 carbon atoms. Hence, propyl and butyl groups are preferred. When $R^1$ is aromatic or alkylaryl, it generally contains from 6 to 30 carbon atoms, desirably from 7 to 16 carbon atoms, and preferably from 7 to 9 carbon atoms. The $R^2$ and $R^3$ moieties are univalent hydrocarbon groups where n is equal to 1 or preferably 0. That is, when n is 0, $R^2$ is non-existent. $R^2$ and $R^3$, independently represent hydrocarbon groups containing from 1 to 20 carbon atoms, e.g., aliphatic, aromatic, or combinations thereof, desirably from 1 to 11 carbon atoms such as an alkyl, and preferably an alkyl having from 1 to 2 carbon atoms. Hence, methyl and ethyl groups are preferred. Y and Z independently represent a hydrogen atom, an aminoalkyl group, a polyaminoalkyl group, an aryl group, an alkylalkoxysilane group or an aminoalkylalkoxysilane group wherein the alkyl group has from 1 to 12 carbon atoms and the alkoxy group has from 1 to 6 carbon atoms. Since Y and Z represent independent groups, the groups can be the same or different. Y is generally a hydrogen atom or an aminoalkyl group. When Y is an aminoalkyl group, it should contain at least one secondary or primary amine moiety. Generalized examples of Y and Z groups include $-(CH_2)_pNH_2$; $-[(CH_2)_2NH]_qH$, $-C_6H_5$, $-(CH_2)_pSi(OR)_3$, and $-[(CH_2)_2NH]_q(CH_2)_pSi(OR)_3$, where q is 1 to 10,000, preferably 1 to 1,000 (polymeric) and wherein p is 1 to 12. The alkoxy groups, $-OR^3$ which are attached to the silicon atom of the aminosilane or polyaminosilane compound are easily hydrolyzed to silanol groups, other easily hydrolyzed groups may be substituted for the alkoxy groups. Examples of suitable hydrolyzable groups which can be substituted for the preferred alkoxy groups include acyloxy, amine or chloride. Examples of suitable aminosilane and polyaminosilane compounds of the present invention include:
4-aminobutyltriethoxysilane
(aminoethylaminomethyl)phenethyltrimethoxysilane
N-(2-aminoethyl)-3-aminopropylmethyldimethoxysilane
3-aminopropyltriethoxysilane
3-aminopropyltrimethoxysilane
N-2-aminoethyl-3-aminopropyltrimethoxysilane
N-2-aminoethyl-3-aminopropyltris(2-ethylhexoxy)silane
6-(aminohexylaminopropyl)trimethoxysilane
3-aminophenyltrimethoxysilane
3-(1-aminopropoxy)-3,3-dimethyl-1-propenyltrimethoxysilane
3-aminopropyltris(methoxyethoxyethoxy)silane
3-aminopropylmethyldiethoxysilane
bis[3-(trimethoxysilyl)propyl]ethylenediamine
n-phenylaminopropyltrimethoxysilane
trimethoxysilylpropyldiethylenetriamine
ω-aminoundecyltrimethoxysilane
bis[3-(triethoxysilyl)propyl]amine
dimethoxymethylsilylpropyl(polyethyleneimine)
trimethoxysilylpropyl(polyethylenimine).

Highly preferred aminosilane compounds of the present invention are 3-aminopropyltriethoxysilane, 3-aminopropyltrimethoxysilane and N-2-aminoethyl-3-aminopropyltrimethoxysilane.

A suitable aminosilane compound can be utilized either separately or in combination with one or more aminosilanes in the present invention. Typically, an aminosilane is utilized separately and the amount thereof is generally from about 5 parts to about 70 parts by weight, desirably from about 20 parts to about 60 parts by weight and preferably from about 35 parts to about 50 parts by weight based upon each 100 parts by weight of the total oxidation resistant composition.

Substitution in part of the aminosilane component by any of a number of commercial amine curing agents can be accomplished within the scope of the present invention. An example of a suitable compound would be diethylenetriamine, $H_2NCH_2CH_2NHCH_2CH_2NH_2$ or triethylenetetramine, $H_2NCH_2CH_2NHCH_2CH_2NHCH_2CH_2NH_2$. It is furthermore noted that substitution in total or in part of the aminosilane component by aluminum, titanium, zirconium or similarly based amine compounds are within the scope of the present invention. A similar proviso can be made with regard to the epoxy silane component.

The epoxy silane compound can be any compound which contains at least one epoxy group and one silane group therein. Desirably, such a compound can be a glycidoxysilane or an epoxycyclohexylsilane compound. Considering the epoxy silane compound, it generally has the formula:

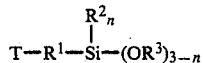

wherein $R^1$ is generally a hydrocarbon group having from 1 to about 30 carbon atoms. The divalent $R^1$ moiety can be an aliphatic, aromatic, or combinations thereof, e.g., an alkyl group, an aromatic group, an alkylalkoxy group, an alkylalkenyl group or an alkylaryl group. When $R^1$ is aliphatic, an alkyl group is preferred. When $R^1$ is aliphatic, it can contain 1 to 20 carbon atoms, desirably from 1 to 11 carbon atoms, and preferably 2 or 3 carbon atoms. Hence, an ethyl or a propyl group is preferred. When $R^1$ is aromatic or alkylaryl, it generally contains from 6 to 30 carbon atoms, desirably from 7 to 16 carbonatoms, and preferably from 7 to 9 carbon atoms. Considering the silane substituted groups, that is $R^2$, and $R^3$, these groups are as set forth hereinabove with regard to the description of the aminosilanes and are thus hereby fully incorporated by reference. T represents an epoxycyclohexyl group of a glycidoxy group, or alkyl derivatives thereof.

Examples of suitable epoxy silane compounds of the present invention include:
(3-glycidoxypropyl)methyldiethoxysilane
(3-glycidoxypropyl)trimethoxysilane
2-(3,4-epoxycyclohexyl)ethylmethyldimethoxysilane
2-(3,4-epoxycyclohexyl)ethyltrimethoxysilane and
[2-(3,4-epoxy-4-methylcyclohexyl)propyl]methyldiethoxy silane. A highly preferred epoxy silane is (3-glycidoxypropyl)trimethoxysilane.

The amount of the glycidoxysilane compound is from about 5 to about 70 parts by weight, desirably from about 10 to about 55 parts by weight, and preferably from about 15 to about 40 parts by weight being preferred for each 100 parts by weight of the total oxidation resistant composition.

The epoxy resin can be any conventional epoxy compound as well as those known to the art and to the literature. Thus, various epoxies can be utilized as set forth in "Handbook of Epoxy Resins," H. Lee and K. Neville, McGraw-Hill, New York (1967), "Epoxide Resins," W. G. Potter, Springer-Verlag, New York (1970), and "Epoxy Resin Chemistry and Technology," C. A. May and Y. Tanaka (editors) Marcel Dekker, New York (1973), all of which are hereby fully incorporated by reference. The classical example of an epoxy resin is the reaction product of bisphenol A and epichlorohydrin. Other hydroxyl containing compounds including resorcinol, hydroquinone, glycols, glycerol, and the like, can replace bisphenol A as is known to those skilled in the art and to the literature. Of course, numerous other epoxy resins can be utilized as well as epoxy-siloxane compositions such as bis(3-glycidoxypropyl)tetramethyldisiloxane). Included within the definition of epoxy resins are epoxy novolacs and the like as well as epoxy resins containing 3 or more functional groups, that is epoxy groups therein, and the like.

The epoxy resin is generally utilized in amounts of from about 5 parts to about 90 parts by weight, desirably from about 10 parts to about 50 parts by weight, and preferably from about 20 parts to about 40 parts by weight, for each 100 parts by weight of total oxidation resistant composition.

As noted above, various binary systems can be utilized. Thus, the binary systems include a mixture of the epoxy resin and the aminosilane or an aminosilane and the epoxysilane compound. Thus, regardless of which binary system is utilized, each system has at least one epoxy compound therein and at least one aminosilane-containing compound therein. Whenever a binary system is utilized, the amount of one of the components is from about 20 to about 80 parts by weight and preferably from 30 to 70 parts by weight, with the amount of the remaining component being from about 80 to about 20 parts by weight. Preferably, however, the ternary system exists, that is the oxidation resistant composition contains the epoxy resin, the aminosilane compound, be it a polyamino and/or a monoaminosilane compound, and the epoxysilane compound.

In forming the oxidation resistant composition, a premixture of the epoxy resin and the epoxy silane compound is usually formed. The aminosilane and/or the polyaminosilane compounds are then added to the premixture and blended or mixed therewith. The mixing procedure with the metallic powder is generally carried out in a solvent system. A solvent system is desirably utilized in that is an effective manner to apply a thin coating to the various above-noted rare earth magnet materials. The solvents are generally any organic solvent which is effective in dissolving the oxidation resistant composition and includes alcohols having from 1 to 8 carbon atoms, various aromatic compounds such as toluene, benzene, xylene, and the like. Various ketones containing a total of from about 3 to about 10 carbon atoms can be utilized such as methylethylketone. It is an important aspect of the present invention that the water content within the solvent be generally less than 5 percent by weight based upon the total weight of the solvent in order to limit hydrolysis.

The oxidation resistant composition is generally inert in the solvents for a period of a few days. Upon application to the rare earth magnetic materials, a thin film is formed. Upon evaporation of the solvent, the various epoxy compounds generally crosslink the various amine containing silane compounds. The cure can take place at room temperature or heat can be utilized to increase the cure rate. Generally some mixing is desired during cure to be sure that the particles are coated and to prevent large chunks, agglomerations, and the like from forming. The treated materials can be heated up to 150°

C. in vacuo and generally less than 130° C. in vacuo in order to complete the hydrolysis reaction and remove any volatile components. The application of the oxidation resistant composition to the rare earth magnets or magnetic materials unexpectedly provides good oxidation resistance when only a small amount and hence a very thin film or coating is formed. The dramatic retention of magnetic properties after subjecting the treated rare earth magnet powders to an extremely harsh oxidizing environment was unexpected for such thin films.

The oxidation resistant composition can optionally contain various additives therein such as catalyst and hardeners. Catalysts are generally desired since they increase the reaction cure rate as well as result in some reaction of the epoxysilane with the epoxy resin. Various known conventional catalyst systems can be utilized such as 2-methylimidazole and tertiary amines such as triethylamine, benzyldimethylamine, and the like. The amount of the catalyst is generally small as from about 0.1 parts to about 5 parts by weight for every 100 parts by weight of oxidation resistant composition.

Hardeners are utilized to impart heat resistance as well as chemical resistance to the composition. Various conventional hardeners can be utilized such as polyamides, anhydrides, and polyamines. Examples of suitable polyamines include diethylenetriamine, methylenedianiline, DETA modified with liquid epoxy resin, and the like. The amount of hardeners is also small as from about 0.1 to about 5 parts by weight, and desirably from about 1 part to about 3 parts by weight for every 100 parts by weight of the oxidation resistant composition.

The amount of the rare earth magnetic material utilized in association with the oxidation resistant composition is such that it occupies from about 40 or 45 percent to about 90 percent by volume and desirably from about 55 percent to about 70 percent by volume based upon the total volume of the rare earth magnetic material and the polymeric binder composition.

Although large and/or solid forms of the rare earth magnetic material can be utilized, it is generally utilized as a fine powder, for example, as particles of from about 1 to about 300 microns and desirably from about 10 to about 200 microns. Fine individual particles or small agglomerations of particles are thus coated with the oxidation resistant composition of the present invention thereby inhibiting oxidation. Powders of the magnetic material are generally utilized inasmuch as they can be molded to generally form any desired shape, size, or form for a suitable end use application as in motors, and the like. Whenever the rare earth magnetic materials are formed into an end product such as a magnet for a motor, etc., various binders are desirably utilized to form a composite. That is, binders are utilized whenever it is desired to substantially coat or encapsulate the rare earth magnet or magnet material to ensure that the oxidation resistant composition will be maintained thereon. Binders are desirably utilized whenever rare earth magnetic powders or particles are utilized and blended with the oxidation resistant composition such that a composite blend or mixture thereof is produced. The use of the binder thus essentially produces a magnet material which is encapsulated or substantially encapsulated by the oxidation resistant composition. The amount of binder is generally from about 2 percent to about 60 percent by volume and preferably from about 25 percent to about 40 percent by volume based upon the total volume of the binder, the oxidation resistant composition, and the rare earth magnet or magnet material. The binders are generally polymers which are suitable with regard to the various processing conditions utilized in forming magnetic end products such as extruding, injection molding, calendering, compression molding, and the like. Suitable examples of such binders include the various acrylic rubbers, various polyesters, nitrile rubber, nylons, and the like.

The polymer bonded type rare earth oxidation resistant coated magnets of the present invention can be utilized wherever oxidation resistance is required as in high temperature operations. Examples of suitable uses include utilization in motors, actuators, loudspeakers, and the like. Very desirable end uses are thus obtained due to the improved magnetic forces generated by the rare earth magnets and the largely improved oxidation resistant properties obtained.

Another important aspect of the present invention is the use of various oxymetallate compounds or combinations thereof which have been found to be very effective corrosion inhibitors or impart corrosion resistance. Any conventional water-soluble oxymetallate compound can be utilized such as $K_3PO_4$; $Na_2MoO_4$, $K_2Cr_2O_7$, and the like, as well as combinations thereof. $MCr_2O_7$ and $MCrO_4$ are generally preferred, where M represents H, Li, Na, K, and the like. The oxymetallate inhibiting compositions of the present invention can be applied to either the rare earth magnet or magnetic material, to the magnet or magnetic material which has been previously coated with the above oxidation resistant compounds of the present invention, or applied to the oxidation resistant coating and mixed therewith and thus applied to the magnet or the magnet powder along with the oxidation resistant coating. Application of the oxymetallate, preferably chromate or dichromate to either the noncoated or previously coated magnet or magnetic materials has been found to give better results and thus is preferred. The application or method of application has been found to be important inasmuch as different corrosion and oxidation resistance results are obtained. For example, the pH of the oxymetallate solution can greatly influence the degree of corrosion and oxidation resistance imparted to the treated metallic powder. Application of the oxymetallate composition by itself to the magnetic materials, etc., may result in improved corrosion resistance but is not nearly as good as a solution application. Inasmuch as oxymetallate compounds, such as chromate and dichromate tend to be insoluble in nonpolar, organic solvents, they are generally applied using suitable solvents. Such solvents are known to the art as well as to the literature such as water, alcohols and alcohol-water mixtures with the various alcohols as those having from 1 to 8 carbon atoms being desired, particularly methanol. Due to the low solubility of the oxymetallate in alcohol and alcohol-water mixtures, low molarity solutions are utilized. Thus 2 percent by weight of a 0.05 molarity solution of chromate in water can be utilized in association with 98 percent by weight of a solvent such as methanol. It should be apparent that the molarity of the chromate, as well as the amount of the solvent utilized can vary greatly within the teachings of the present invention. The important aspect is the application of the chromate or dichromate composition in solution form to the rare earth magnet or magnetic materials. Application can be obtained in any suitable manner as by spraying, dipping, brushing, etc. Once the magnet or magnetic material has been treated, the solvent is allowed to evaporate therefrom. The amount of oxymetallate composition utilized will generally vary with the surface area of the magnet or particles to be treated. The use of these corrosion treatments, such as rinsing the final coated product with an oxymetallate solution, negligibly change the weight percentage coating, however they can typically reduce the loss of magnetic properties due to salt corrosion in a humidity-controlled environment by as much as 90 percent and reduce the corresponding weight gain of the metallic powder due to corrosion also by 90 percent or more.

The present invention will be better understood by reference to the following examples.

EXAMPLE I

A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in aqueous methanol to provide a 2 percent solution. A 20 gram sample of finely ground NdFeB magnet alloy was mixed with 20 grams of the solution and blended for 72 hours. The sample was decanted and the treated magnet powder was rinsed and dried. A treated sample exhibited an oxidation rate at 300° C. of 0.24 percent/hour over a period of two hours while an untreated sample oxidized at a rate of 2.02 percent/hour under identical conditions.

EXAMPLE II

A mixture of 18.7 parts of a bisphenol A-epichlorohydrin resin (e.g. Epon 828, DER 331 or similar epoxy resin), 37.3 parts [3-(glycidyloxy)propyl]trimethoxysilane and 44.0 parts [3-(amino)propyl]triethoxysilane was dissolved in toluene to provide a 50 percent solution. A 15 gram sample of NdFeB magnet alloy was mixed with 1 gram of the solution and blended for 2 minutes. The sample was rinsed and dried. A treated sample exhibited an oxidation rate at 300° C. of 0.0 percent/hour over a period of two hours while an untreated sample oxidized at a rate of 0.98 percent/hour under identical conditions. The treated sample did not show any degradation of intrinsic coercivity or residual induction after exposure at 300° C. for two hours while the intrinsic coercivity of the uncoated control samples decreased by more than 95 percent and the residual induction decreased by 45 percent.

EXAMPLE III

A mixture of 20 parts of bisphenol A-epichlorohydrin resin (e.g. Epon 828, DER 331 or similar epoxy resin), 40 parts [3-(glycidyloxy)propyl]trimethoxysilane and 40 parts [3-(amino)propyl]triethoxysilane was dissolved in aqueous methanol to provide a 2 percent solution. A 20 gram sample of finely ground SmCo(1-5) magnet alloy was mixed with 21 grams of the solution and blended for 71 hours. The sample was decanted and the treated magnet powder was rinsed and dried. A treated sample exhibited an oxidation rate at 300° C. of 0.21 percent/hour over a period of two hours while an untreated sample oxidized at a rate of 0.93 percent/hour under identical conditions.

EXAMPLE IV

A mixture of 9.5 parts of a bisphenol A-epichlorohydrin resin (e.g. Epon 828, DER 331 or similar epoxy resin), 10.3 parts of an epoxy novolac resin (e.g. Dow Tactix 485), 38.2 parts of [3-(glycidyloxy)propyl]trimethoxysilane and 42.0 parts [3-(amino)propyl]triethoxysilane was dissolved in methyl ethyl ketone to provide a 25 percent solution. A 60 gram sample of NdFeB magnet alloy was mixed with 5 grams of the solution and blended for 2 minutes. The sample was then dried. A treated sample oxidized 0.05 percent at 200° C. over a period of 100 hours while an untreated sample oxidized 2.12 percent under identical conditions.

EXAMPLE V

A mixture of 19.6 parts of a bisphenol A-epichlorohydrin resin (e.g. Epon 828, DER 331 or similar epoxy resin), 39.2 parts [3-(glycidyloxy)propyl]trimethoxysilane and 41.2 parts [3-(amino)propyl]triethoxysilane was dissolved in aqueous methanol to provide a 3 percent solution. A 20 gram sample of finely milled NdFeCoB magnet alloy was mixed with 20 grams of the solution and blended for 70 hours. The sample was decanted and the treated magnet powder was rinsed and dried. A treated sample exhibited an oxidation rate of 300° C. of 0.12 percent/hour over a period of two hours while an untreated sample oxidized at a rate of 1.35 percent/hour under identical conditions.

EXAMPLE VI

A mixture of 34.8 parts of a bisphenol A-epichlorohydrin resin (e.g. Epon 828, DER 331 or similar epoxy resin), 17.4 parts [3-(glycidyloxy)propyl]trimethoxysilane and 47.8 parts [3-(amino)propyl]triethoxysilane was dissolved in toluene to provide a 50 percent solution. A 50 gram sample of NdFeB magnet alloy was mixed with 10 grams of the solution and blended for 2 minutes. The sample was decanted rinsed and dried. A treated sample exhibited an oxidation rate of 300° C. of 0.13 percent/hour over a period of two hours while an untreated sample oxidized at a rate of 2.52 percent/hour under identical conditions.

EXAMPLE VII

A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in aqueous methanol to provide a 4 percent solution. 1200 grams of finely ground NdFeB magnet alloy was mixed with 500 grams of the solution and rinsed and dried. A treated sample exhibited an oxidation rate of 300° C. of 0.145 percent/hour over a period of two hours while an untreated sample oxidized at a rate of 2.06 percent/hour under the same conditions. A 0.75 gram aliquot of a 0.017M NaCl solution was added to 2.5 gram samples of the coated and uncoated alloy and the samples were dried in vacuo at 110° C. The samples were then placed in a closed container containing saturated solutions of $(NH_4)_2SO_4$. The uncoated sample exhibited a weight gain of 5.6 percent after 137 hours while the coated sample showed only a 3.2 percent weight gain after 135 hours.

EXAMPLE VIII

A 40 gram sample of the coated powder (Example VII) was blended with 10 grams of 0.05M $K_2Cr_2O_7$ solution and mixed for 2 hours. The dichromate-treated sample was then decanted and dried in vacuo at 110° C. A 0.75 gram aliquot of a 0.017M NaCl solution was added to a 2.5 gram sample of the alloy and the sample was dried in vacuo at 110° C. The sample was placed in a closed container containing saturated solutions of $(NH_4)_2SO_4$. The sample did not exhibit any weight gain (within experimental error) even after more than 1100 hours of exposure.

EXAMPLE IX 250 grams of NdFeB alloy was mixed with 50 grams of a 0.5M $K_2Cr_2O_7$ solution for 1 hour and the alloy was then decanted and dried in a vacuo at 110° C. A mixture of 19.2 parts of a bisphenol A-epichlorohydrin resin (e.g Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in aqueous methanol to provide a 5.5 percent solution. 40 grams of the dichromate treated NdFeB magnet alloy was mixed with 18 grams of the solution and blended for 64.5 hours. The sample was decanted and the treated magnet powder was dried in vacuo. A 0.75 gram aliquot of a 0.086M NaCl solution was added to a 2.5 gram sample of the coated alloy and the same was dried in vacuo at 110° C. The sample was then placed in a closed container containing saturated solutions of $(NH_4)_2SO_4$. The sample did not exhibit any weight gain (within experimental error) after 1400 hours while an uncoated sample showed a 7.9 percent increase in weight after 43 hours, a 19 percent weight gain after 114 hours and a 24 percent weight gain after 306 hours.

EXAMPLE X

A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in a methanol/0.05M $K_2CrO_4$ (92.8) solution to provide a 5 percent solution. 40 grams of finely ground NdFeB magnet alloy was mixed with 20 grams of the solution and blended for 69 hours. The sample was decanted and the treated magnet powder was dried. A 0.75 gram aliquot of a 0.086M NaCl solution was added to a 2.5 gram sample of the coated alloy and the sample was dried in vacuo at 110° C. The sample was then placed in a closed container containing saturated solutions of $(NH_4)_2SO_4$. After 207 hours, the treated sample had not gained any weight (within experimental error) while an uncoated sample had shown a 22.6 percent weight gain after 210.5 hours. After 497 hours, the treated sample had gained 3.98 percent in weight while an uncoated sample had shown a 24.6 percent weight gain after 498.5 hours.

EXAMPLE XI

A mixture of 30 parts of an ethylene/vinyl acetate copolymer (25 percent vinyl acetate content), 35 parts [3-(glycidyloxy)propyl]trimethoxysilane and 35 parts [3-(amino)propyl]triethoxysilane was dissolved in a methyl ethyl ketone-toluene blend (18 parts MEK:72 parts toluene) to provide a 10 percent solution. 30 grams of finely ground NdFeB magnet alloy was mixed with 5 grams of the solution and blended for one hour. The sample was decanted and dried in vacuo for two hours at 80° C. A treated sample exhibited an oxidation rate at 300° C. of 0.607 percent/hour over a period of two hours while an untreated sample oxidized at a rate of 2.51 percent/hour under the same conditions. A 0.75 gram aliquot of a 0.017M NaCl solution was added to a 2.5 gram sample of the coated alloy and dried in vacuo at 110° C. The sample was then placed in a closed container containing saturated solutions of $(NH_4)_2SO_4$. The coated sample exhibited a weight gain of 5.2 percent after 168 hours while uncoated samples showed weight gains of 4.80 percent and 6.00 percent after 161 hours.

EXAMPLE XII

A mixture of 50 parts of a bisphenol A-epichlorohydrin resin (e.g. Epon 828, DER 331 or similar epoxy resin), and 50 parts [3-(glycidyloxy)propyl]trimethoxysilane was dissolved in methyl ethyl ketone to provide a 10 percent solution. A 40 gram sample of NdFeB magnet alloy was mixed with 10 grams of the solution and blended for 2 minutes. The sample was decanted and dried in vacuo at 95° C. A treated sample exhibited an oxidation rate at 300° C. of 0.881 percent/hour over a period of two hours while an uncoated sample oxidized at a rate of 1.43 percent/hour under similar conditions.

EXHIBIT XIII .

A mixture of 50 parts of [3-(amino)propyl]triethoxysilane and 50 parts [3-(glycidyloxy)propyl]trimethoxysilane was dissolved in a methyl ethyl ketone to provide a 10 percent solution. A 40 gram sample of NdFeB magnet alloy was mixed with 10 grams of the solution and blended for two minutes. The sample was decanted and dried in vacuo at 95° C. A treated sample exhibited an oxidation rate at 300° C. of 0.071 percent/hour over a period of two hours while an uncoated sample oxidized at a rate of 1.43 percent/hour under similar conditions.

EXAMPLE XIV

A mixture of 50 parts of a bisphenol A-epichlorohydrin resin (e.g. Epon 828, DER 331 or similar epoxy resin), and 50 parts [3-(amino)propyl]triethoxysilane was dissolved in methyl ethyl ketone to provide a 10 percent solution. A 40 gram sample of NdFeB magnet alloy was mixed with 10 grams of the solution and blended for two minutes. The sample was then decanted and dried in vacuo at 95° C. A treated sample exhibited an oxidation rate at 300° C. of 0.084 percent/hour over a period of two hours while an uncoated sample oxidized at a rate of 1.43 percent/hour under similar conditions.

EXAMPLE XV

A mixture of 50 parts of a bisphenol A-epichlorohydrin resin (e.g. Epon 828, DER 331 or similar epoxy resin), and 50 parts [3-(amino)propyl]triethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate at 300° C. of 0.053 percent/hour over a period of two hours while an uncoated sample oxidized at a rate of 2.36 percent/hour under similar conditions.

EXAMPLE XVI

A mixture of 50 parts of a bisphenol A-epichlorohydrin resin (e.g. Epon 828, DER 331 or similar epoxy resin), and 50 parts [3-(glycidyloxy)propyl]trimethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate at 300° C. of 0.290 percent/hour over a period of two hours while an uncoated sample oxidized at a rate of 2.36 percent/hour under similar conditions.

EXAMPLE XVII

A mixture of 50 parts of [3-(glycidyloxy)propyl]-trimethoxysilane and 50 parts [3-(amino)propyl]triethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate of 300° C. of 0.162 percent/hour over a period of two hours while an uncoated sample oxidized at a rate of 2.36 percent/hour under similar conditions.

EXAMPLE XVIII

[3-(amino)propyl]triethoxysilane was dissolved in aqueous methanol to provide a 5 percent solution. A 40 gram sample of NdFeB magnet alloy was mixed with 20 grams of the solution and blended for 50 hours. The sample was decanted, rinsed with isopropanol, and dried in vacuo at 110° C. A treated sample exhibited an oxidation rate of 300° C. of 2.84 percent/hour over a period of two hours while an uncoated sample oxidized at a rate of 2.98 percent/hour under similar conditions.

EXAMPLE XIX

A mixture of 19.2 parts of a bisphenol A-epichlorohydrin resin (e.g., Shell Epon 828, Dow DER 331 or similar epoxy resin), 38.5 parts [3-(glycidyloxy)propyl][trimethoxysilane and 42.3 parts [3-(amino)propyl]triethoxysilane was dissolved in a methanol/0.05M $K_2CrO_4$ (84:16) solution to provide a 5 percent solution. 40 grams of finely ground NdFeB magnet alloy was mixed with 20 grams of the solution and blended for 68.5 hours. The sample was decanted and the treated magnet powder was dried. A 0.75 gram aliquot of a 0.086M NaCl solution was added to a 2.5 gram sample of the coated alloy and the sample was dried in vacuo at 110° C. The sample was then placed in a closed container containing saturated solutions of $(NH_4)_2SO_4$. After 319.5 hours, the treated sample had not gained any weight (within experimental error).

As apparent from the above examples, it is evident that vastly improved properties, in excess of 4-fold factor and often in excess of a 10- and even a 100-fold factor, were achieved utilizing the oxidation resistant compositions of the present invention.

While in accordance with the Patent Statutes, the best mode and preferred embodiment have been set forth, the scope of the invention is not limited thereto, but rather by the scope of the attached claims.

What is claimed is:

1. An oxidation resistant composition for a rare earth magnet or magnet material, comprising:
   an oxidation resistant coating composition cured in the presence of a rare earth magnet or magnet material, said coating composition comprising;
   (1) an amino containing silane,
   (2) an epoxy silane, and
   (3) an epoxy resin,
   said amino containing silane being an aminosilane or a polyaminosilane having the formula

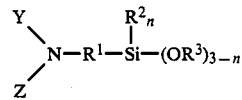

wherein said $R^1$ group has from 1 to 30 carbon atoms, wherein said $R^1$ group is an aliphatic, an aromatic, or combinations thereof, wherein n is 1 or 0, wherein $R^2$ and $R^3$, independently, is an aliphatic, an aromatic, or combinations thereof having from 1 to 20 carbon atoms, wherein Y and Z independently is a hydrogen atom, an aminoalkyl group, a polyaminoalkyl group, an aryl group, an alkylalkoxysilane group, or an aminoalkylalkoxysilane group wherein said alkyl group has from 1 to 12 carbon atoms and said alkoxy group has from 1 to 6 carbon atoms,
   wherein said epoxy silane compound has the formula

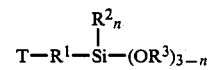

wherein said $R^1$ group has from 1 to 30 carbon atoms, wherein said $R^1$ group is an aliphatic, an aromatic, or combinations thereof, wherein n is 1 or 0, wherein $R^2$ and $R^3$, independently, is an aliphatic, an aromatic, or combinations thereof having from 1 to 20 carbon atoms, and wherein T is an epoxycyclohexyl group, a glycidoxy group, or an alkyl derivative thereof, and
   the amount of said amino containing silane and said epoxy silane in said coating composition each being from about 5 to about 70 parts by weight per 100 parts by weight of said coating composition, and the amount of said epoxy compound being from about 5 parts to about 90 parts by weight per every 100 parts by weight of said coating composition.

2. An oxidation resistant composition according to claim 1, wherein said $R^1$ of said amino containing silane compound and said epoxy silane compound independently is an aliphatic having from 1 to 20 carbon atoms, an aromatic or an alkyl substituted aromatic having from 6 to 30 carbon atoms, and wherein $R^2$ and $R^3$ of said amino containing silane and said epoxy silane compound independently is an aliphatic having from 1 to 11 carbon atoms.

3. An oxidation resistant composition according to claim 2, wherein $R^1$ of said amino containing silane and said epoxy silane independently is an aliphatic containing from 1 to 11 carbon atoms, an aromatic or an alkyl substituted aromatic containing from 7 to 16 carbon atoms,
   wherein the amount of said amino containing silane is from about 20 to about 60 parts by weight, wherein the amount of said epoxy silane is from about 10 to about 55 parts by weight, and wherein said epoxy resin is from about 10 to about 50 parts by weight.

4. An oxidation resistant composition according to claim 3, wherein said $R^1$ of said amino containing silane compound and said epoxy silane compound independently is an alkyl containing 3 or 4 carbon atoms, an aromatic or an alkyl substituted aromatic containing from 7 to 9 carbon atoms, wherein $R^2$ and $R^3$ is an alkyl having from 1 to 2 carbon atoms, wherein said Y aminoalkyl group contains at least one secondary or primary amine moiety, wherein the amount of said amino containing silane is from about 35 to about 50 parts by weight, wherein the amount of said epoxy silane is from about 10 parts to about 40 parts by weight, and wherein the amount of said epoxy resin is from about 20 parts to about 40 parts by weight.

5. An oxidation resistant composition according to claim 1, wherein said amino containing silane compound is 4-aminobutyltriethoxysilane, (aminoethylaminomethyl)phenethyltrimethoxysilane, N-(2-aminoethyl)-3-aminopropylmethyldimethoxysilane, 3-aminopropyltriethoxysilane, 3-aminopropyltrimethoxysilane, N-2-aminoethyl-3-aminopropyltrimethoxysilane, N-2-aminoethyl-3-aminopropyltris(2-ethylhexoxy)silane, 6-(aminohexylaminopropyl)trimethoxysilane, 3-aminophenyltrimethoxysilane, 3-aminopropylmethyldiethoxysilane, bis[3-(trimethoxysilyl)propyl]ethylenediamine, n-phenylaminopropyltrimethoxysilane, trimethoxysilylpropyldiethylenetriamine, ω-aminoundecyltrimethoxysilane, bis[3-(triethoxysilyl)propyl]amine, dimethoxymethylsilylpropyl(polyethyleneimine), trimethoxysilylpropyl(polyethylenimine), and wherein said epoxy silane is (3-glycidoxypropyl)methyldiethoxysilane, (3-glycidoxypropyl)trimethoxysilane, 2-(3,4-epoxycyclohexyl)ethylmethyldimethoxysilane, 2-(3,4-epoxycyclohexyl)ethyltrimethoxysilane and [2-(3,4-epoxy-4-methylcyclohexyl)propyl]methyldiethoxy silane.

6. An oxidation resistant composition according to claim 1, wherein said amino containing silane is 3-aminopropyltriethoxysilane, 3-aminopropyltrimethoxysilane, or N-2-aminoethyl-3-aminopropyltrimethoxysilane, wherein said epoxy silane compound is (3-glycidoxypropyl)-trimethoxysilane, wherein said epoxy is the reaction product of bisphenol A and epichlorohydrin, wherein the amount of said amino containing silane is from about 20 to about 60 parts by weight, wherein the amount of said epoxy silane is from about 10 to about 55 parts by weight, and wherein the amount of said epoxy resin is from about 10 to about 50 parts by weight.

7. An oxidation resistant composition according to claim 1, including from about 0.1 to about 10 parts by weight of an oxymetallate inhibitor for every 100 parts by weight of said coating composition.

8. An oxidation resistant composition according to claim 3, including from about 0.1 to about 10 parts by weight of an oxymetallate inhibitor for every 100 parts by weight of said coating composition, wherein said oxymetallate compound is $K_3PO_4$, $Na_2MoO_4$, $K_2Cr_2O_7$, $MCr_2O_7$, or $MCrO_4$, or combinations thereof, and wherein M is H, Li, Na, or K.

9. An oxidation resistant composition according to claim 6, including from about 0.1 to about 10 parts by weight of an oxymetallate inhibitor for every 100 parts by weight of said coating composition, wherein said oxymetallate compound is $MCr_2O_7$, $MCrO_4$, or combinations thereof, and where M is H, Li, Na, or K.

10. An oxidation resistant composition for a rare earth magnet or magnet material, comprising:
an oxidation resistant coating composition cured in the presence of a rare earth magnet or magnetic material, said coating composition comprising;
(1) an amino containing silane; and
(2) an epoxy silane or an epoxy resin,
said amino containing silane being an aminosilane or a polyaminosilane having the formula

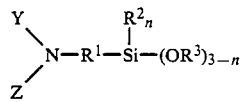

wherein said $R^1$ group has from 1 to 30 carbon atoms, wherein said $R^1$ group is an aliphatic, an aromatic, or combinations thereof, wherein n is 1 or 0, wherein $R^2$ and $R^3$, independently, is an aliphatic, an aromatic, or combinations thereof having from 1 to 20 carbon atoms, wherein Y and Z independently is a hydrogen atoms, an aminoalkyl group, a polyaminoalkyl group, an aryl group, an alkylalkoxysilane group, or an aminoalkylalkoxysilane group wherein said alkyl group has from 1 to 12 carbon atoms and said alkoxy group has from 1 to 6 carbon atoms,
wherein said epoxy silane compound has the formula

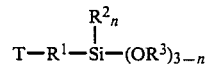

wherein said $R^1$ group has from 1 to 30 carbon atoms, wherein said $R^1$ group is an aliphatic, an aromatic, or combinations thereof, wherein n is 1 or 0, wherein $R^2$ and $R^3$, independently, is an aliphatic, an aromatic, or combinations thereof having from 1 to 20 carbon atoms, and wherein T is an epoxycyclohexyl group, a glycidoxy group, or an alkyl derivative thereof,
the amount of said amino containing silane being from about 20 parts to about 80 parts by weight based upon the total weight of said amino containing silane and said remaining compound, or said epoxy resin, and the amount of said epoxy silane or said epoxy resin being from about 80 parts to about 20 parts by weight based upon the total weight of said epoxy silane or said epoxy resin and said amino containing silane.

11. An oxidation resistant composition according to claim 10, wherein said $R^1$ of said amino containing silane compound and said epoxy silane compound independently is an aliphatic having from 1 to 20 carbon atoms, or an aromatic or an alkyl substituted aromatic having from 6 to 30 carbon atoms, and wherein $R^2$ and $R^3$ of said amino containing silane and said epoxy silane compound independently is an aliphatic having from 1 to 11 carbon atoms.

12. An oxidation resistant composition according to claim 11, wherein $R^1$ of said amino containing silane and said epoxy silane independently is an aliphatic containing from 1 to 11 carbon atoms, or an aromatic or an alkyl substituted aromatic containing from 7 to 16 carbon atoms,
wherein the amount of said amino containing silane is from about 30 to about 70 parts by weight, and wherein the amount of said epoxy silane or said epoxy resin is from about 70 parts to about 30 parts by weight.

13. An oxidation resistant composition according to claim 12, wherein $R^1$ of said amino containing silane compound and said epoxy silane compound independently is an alkyl containing 3 or 4 carbon atoms, or an aromatic or an alkyl substituted aromatic containing from 7 to 9 carbon atoms, wherein $R^2$ and $R^3$ is an alkyl having from 1 to 2 carbon atoms, and wherein said Y aminoalkyl group contains at least one secondary or primary amine moiety.

14. An oxidation resistant composition according to claim 10, wherein said amino containing silane compound is 4-aminobutyltriethoxysilane, (aminoethylaminomethyl)phenethyltrimethoxysilane, N-(2-aminoethyl)-3-aminopropylmethyldimethoxysilane, 3-aminopropyltriethoxysilane, 3-aminopropyltrimethoxysilane, N-2-aminoethyl-3-aminopropyltrimethoxysilane, N-2-aminoethyl-3-aminopropyltris(2-ethylhexoxy)silane, 6-(aminohexylaminopropyl)trimethoxysilane, 3-aminophenyltrimethoxysilane, 3-aminopropylmethyldiethoxysilane, bis[3-(trimethoxysilyl)propyl]ethylenediamine, n-phenylaminopropyltrimethoxysilane, trimethoxysilylpropyldiethylenetriamine, ω-aminoundecyltrimethoxysilane, bis[3-(triethoxysilyl)propyl]amine, dimethoxymethylsilylpropyl(polyethyleneimine), trimethoxysilylpropyl(polyethylenimine), and wherein said epoxy silane is (3-glycidoxypropyl)methyldiethoxysilane, (3-glycidoxypropyl)trimethoxysilane, 2-(3,4-epoxycyclohexyl)ethylmethyldimethoxysilane, 2-(3,4-epoxycyclohexyl)ethyltrimethoxysilane and [2-(3,4-epoxy-4-methylcyclohexyl)propyl]methyldiethoxy silane.

15. An oxidation resistant composition according to claim 10, wherein said amino containing silane is 3-aminopropyltriethoxysilane, 3-aminopropyltrimethoxysilane, or N-2-aminoethyl-3-aminopropyltrimethoxysilane, wherein said epoxy silane compound is (3-glycidoxypropyl)-trimethoxysilane, and wherein said epoxy is the reaction product of bisphenol A and epichlorohydrin.

16. An oxidation resistant composition according to claim 10, including from about 0.1 to about 10 parts by weight of an oxymetallate inhibitor for every 100 parts by weight of said coating composition.

17. An oxidation resistant composition according to claim 12, including from about 0.1 to about 10 parts by weight of an oxymetallate inhibitor for every 100 parts by weight of said coating composition, wherein said oxymetallate compound is $K_3PO_4$, $Na_2MoO_4$, $K_2Cr_2O_7$, $MCr_2O_7$, or $MCrO_4$, or combinations thereof, and wherein M is H, Li, Na, or K.

18. An oxidation resistant composition according to claim 15, including from about 0.1 to about 10 parts by weight of an oxymetallate inhibitor for every 100 parts by weight of said coating composition, wherein said oxymetallate compound is $MCr_2O_7$, $MCrO_4$, or combinations thereof, and where M is H, Li, Na, or K.

* * * * *